(12) United States Patent
Matsusaka

(10) Patent No.: US 7,693,957 B2
(45) Date of Patent: Apr. 6, 2010

(54) DATA MANAGEMENT SYSTEM STORING FILE IN DESIGNATED FOLDER

(75) Inventor: Katsuhiko Matsusaka, Osaka (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1187 days.

(21) Appl. No.: 10/653,255

(22) Filed: Sep. 3, 2003

(65) Prior Publication Data

US 2004/0044746 A1 Mar. 4, 2004

(30) Foreign Application Priority Data

Sep. 4, 2002 (JP) .............................. 2002-259047

(51) Int. Cl.
*G06F 15/16* (2006.01)
(52) U.S. Cl. .............................. 709/217; 707/1; 707/3; 707/7; 707/9; 707/205
(58) Field of Classification Search ................. 709/217; 707/1, 3, 7, 9, 205
See application file for complete search history.

(56) References Cited

U.S. PATENT DOCUMENTS

| | | | | | |
|---|---|---|---|---|---|
| 5,944,780 | A | * | 8/1999 | Chase et al. ................. | 709/201 |
| 5,987,480 | A | * | 11/1999 | Donohue et al. ............. | 715/207 |
| 5,995,756 | A | * | 11/1999 | Herrmann .................... | 717/178 |
| 6,055,527 | A | * | 4/2000 | Badger et al. ................. | 707/2 |
| 6,101,558 | A | * | 8/2000 | Utsunomiya et al. ........... | 710/6 |
| 6,115,741 | A | * | 9/2000 | Domenikos et al. .......... | 709/217 |
| 6,327,608 | B1 | * | 12/2001 | Dillingham .................. | 709/203 |
| 6,549,916 | B1 | * | 4/2003 | Sedlar ......................... | 707/200 |
| 6,549,922 | B1 | * | 4/2003 | Srivastava et al. ............ | 707/205 |
| 6,651,108 | B2 | * | 11/2003 | Popp et al. ................... | 719/315 |
| 6,678,705 | B1 | * | 1/2004 | Berchtold et al. ............ | 707/204 |
| 6,785,693 | B2 | * | 8/2004 | DeLorme et al. ............. | 707/200 |
| 2002/0147840 | A1 | * | 10/2002 | Mutton et al. ................ | 709/239 |
| 2002/0191222 | A1 | * | 12/2002 | Miyamura et al. ........... | 358/402 |

FOREIGN PATENT DOCUMENTS

| | | | |
|---|---|---|---|
| JP | 10-307826 | | 11/1998 |
| JP | 10307826 | A * | 11/1998 |
| JP | 2000-215123 | A * | 1/1999 |

(Continued)

OTHER PUBLICATIONS

Japanese Office Action of counterpart JP Application No. 2002-259047 dated Aug. 7, 2007 with English translation.
Method of Searching for file Using archie Mail Server with partial English translation.

(Continued)

*Primary Examiner*—Dohm Chankong
*Assistant Examiner*—Tauqir Hussain
(74) *Attorney, Agent, or Firm*—Buchanan Ingersoll & Rooney PC

(57) ABSTRACT

A file storage system that allows the user to easily designate a desired location to store a file is configured as follows. In response to a tree structure request mail from a client, a server creates a tree structure for a folder that can be accessed by the user, and describes it in a mail for reply. The user receives the mail with the description of the tree structure, designates a storage location in the form of a reply thereto, and sends a mail with an attached file to be stored to the server. Upon receiving this mail, the server stores the attached file in the designated storage location.

22 Claims, 17 Drawing Sheets

FOREIGN PATENT DOCUMENTS

| | | | |
|---|---|---|---|
| JP | 2000-215123 | | 8/2000 |
| JP | 2000215123 A | * | 8/2000 |
| JP | 2002-189686 | | 7/2002 |

OTHER PUBLICATIONS

Techniques for Utilizing E-Mail, Web, Chat, OFF Meeting, . . . The Internet Provides Opportunities for New Encounters with partial English translation.

* cited by examiner

FIG.7

SUBJECT:Re:Request Tree
BODY: PASSWORD IS INCORRECT

FIG.8

SUBJECT:A Tree in this system

BODY:

THE FOLLOWING LINE SHOULD ALWAYS BE INCLUDED IN THE REPLY

3YsTinH2Kl93huEsneFEeWfW

Root folder
 |
 +FolderA
 | |
 | +FolderAA
 |
 +FolderB
 |

FIG.9

```
SUBJECT:Upload
ATTACHED FILE:File X
BODY:
>3YsTinH2Kl93huEsneFEeWfW
>Root folder
> |
> +FolderA
> |  |
> |  +FolderAA > |
> +FolderB
> |
```

FIG.10

```
SUBJECT:Upload
ATTACHED FILE:File X
BODY:
>3YsTinH2Kl93huEsneFEeWfW
>Root folder
> |
> +FolderA
> |  |
> |  +FolderAA > |
> +FolderB

```
SUBJECT:Upload
ATTACHED FILE:File X,File Y
BODY:
>3YsTinH2Kl93huEsneFEeWfW
>Root folder
> |
> +FolderA
> | |
> |  +FolderAA > |
> +FolderB
> |
```

FIG.12

```
SUBJECT:Upload
ATTACHED FILE:File Y,File Z,File X
BODY:
>3YsTinH2Kl93huEsneFEeWfW
>Root folder
> |
> +FolderA
> | |
> |  +FolderAA > |
> +FolderB

```
SUBJECT:Upload
ATTACHED FILE:File X,File Y,File Z
BODY:
>3YsTinH2Kl93huEsneFEeWfW
>Root folder
> | 3
> +FolderA
> |  | 2
> |  +FolderAA
> | 1,3
> +FolderB
> | 1
```

FIG.14

```
SUBJECT:Upload error
BODY:
THE FOLLOWING ERROR OCCURS.
"FOLDER DESIGNATED AS STORAGE LOCATION DOES NOT EXIST OR IS DELETED."
```

FIG.15

```
SUBJECT:Information
BODY:
FILE UPLOAD ENDS AS FOLLOWS AND YOU ARE LOGGED OUT.

FILE NAME: File X    STORAGE LOCATION: \FolderA\FolderAA
FILE NAME: File X    STORAGE LOCATION: \FolderB
FILE NAME: File Y    STORAGE LOCATION: \FolderA
FILE NAME: File Z    STORAGE LOCATION: \
FILE NAME: File Z    STORAGE LOCATION: \FolderA\FolderAA
```

FIG.16

USER REGISTRATION INFORMATION

| USER'S ADDRESS | USER NAME | GROUP | ACCESS RIGHT | PASSWORD |
|---|---|---|---|---|
| . . . . | . . . . | . . . . | . . . . | . . . . |
| . . . . | . . . . | . . . . | . . . . | . . . . |
|  |  |  |  |  |

FIG.23

<A HREF = "mailto: SERVER'S MAIL ADDRESS?subject = Upload&body = COMMAND CHARACTER STRING FOR STORING ATTACHED FILE + CHARACTER STRING OF ENCRYPTED USER LOG-IN INFORMATION"> FOLDER NAME</A>

FIG.24

SUBJECT:Upload
ATTACHED FILE:File X
BODY:
3YsTinH2Kl93huEsneFEeWfWENenN2EnJ24jnJJ83

DATA MANAGEMENT SYSTEM STORING FILE IN DESIGNATED FOLDER

This application is based on Japanese Patent Application No. 2002-259047 filed with Japan Patent Office on Sep. 4, 2002, the entire content of which is hereby incorporated by reference.

BACKGROUND OF THE INVENTION

1. Field of the Invention

The present invention relates to a data management system and a data management program, and more particularly to a data management system and a data management program capable of storing a file in a storage location designated by a client.

2. Description of the Related Art

Conventionally, in a network environment, data is uploaded from a client to a server (including a document management device, a file management device, a data management device, and the like).

Data is typically uploaded to a server via a client application. This is because a client application allows the user to easily carry out an operation of designating path information of an upload destination.

If the upload destination can be designated easily using an e-mail, it becomes unnecessary to activate a client application only for uploading.

In conventional techniques, however, it takes much time and the effort for the user to designate a desired location into which a file is stored. In addition, the user does not know what folder exists in what structure in a server, so that the user cannot designate the destination to which a file is uploaded.

SUMMARY OF THE INVENTION

The present invention is made to solve the aforementioned problems. An object of the present invention is to provide a data management system and a data management program product allowing the user to designate a desired location in which a file is stored.

In order to achieve the aforementioned object, in accordance with an aspect of the present invention, a data management system includes: a first transmission portion sending a mail from a client to a server for inquiring its folder structure; a second transmission portion, at the server, transmitting its folder structure to the client by mail in response to the inquiry mail sent from the client; a third transmission portion, at the client, designating a storage folder in the form of a reply to the mail sent from the server and sending a mail to the server with an attached file; and a storage portion, at the server, storing the attached file in the storage folder as designated, in response to the mail sent from the client.

In accordance with another aspect of the present invention, a data management program product causes a computer to execute: a first step of sending its folder structure to a client by mail in response to an inquiry mail sent from the client; and a second step of storing an attached file in a designated storage folder when a mail is received from the client with an attached file and with a designation of a storage folder in the form of a reply to the mail sent at the first step.

In accordance with still another aspect of the present invention, a data management server includes: a transmission portion sending its folder structure to a client by mail in response to an inquiry mail sent from the client; and a storage portion storing an attached file into a designated storage folder when a mail is received from the client with an attached file and with a designation of a storage folder in the form of a reply to the mail sent by the transmission portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows a mail body where a password is mismatched.

FIG. 8 illustrates a mail body describing a tree structure.

FIG. 9 illustrates a specific example of a mail body where one file is stored in one folder.

FIG. 10 illustrates a specific example of a mail body where one file is stored in a plurality of folders.

FIG. 11 illustrates a specific example of a mail body where a plurality of files are stored in one folder.

FIG. 12 illustrates a specific example of a mail body where a plurality of files are stored in a plurality of folders.

FIG. 13 illustrates a specific example of a mail body where a plurality of files are stored in a plurality of folders.

FIG. 14 illustrates a body text of a notification mail where processing results in an error.

FIG. 15 illustrates a specific example of a body text of a processing result notification mail where attached files storing processing ends normally.

FIG. 16 illustrates a specific example of user registration information.

FIG. 23 illustrates a part of the content of HTML mail describing a tree structure.

FIG. 24 illustrates a specific example of a mail returned by the user.

DESCRIPTION OF THE PREFERRED EMBODIMENTS

Figure 1:
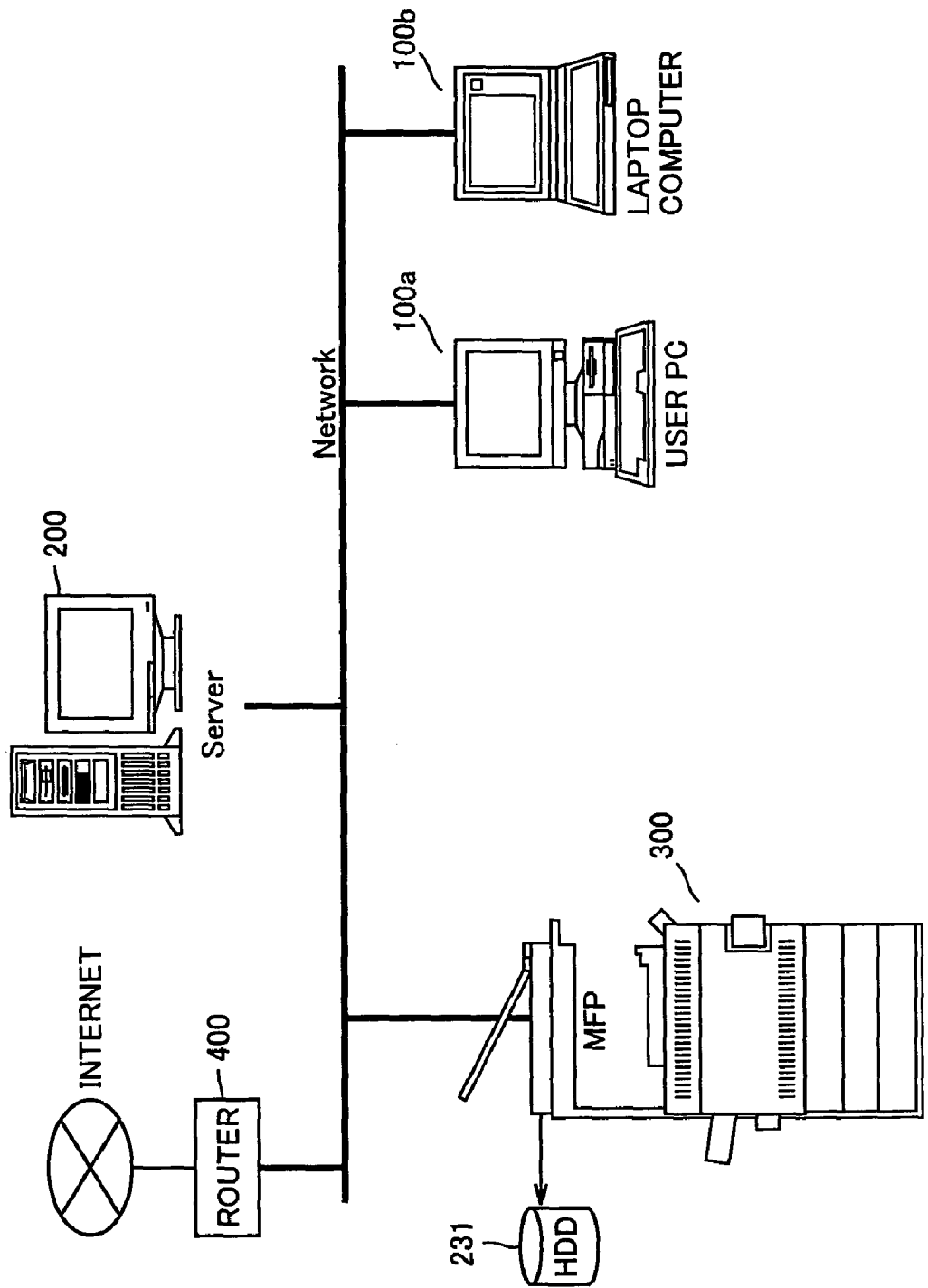
FIG. 1 is a diagram showing a configuration of a shared document management system in accordance with an embodiment of the present invention.

Referring to FIG. 1, a shared document management system has hardware configured with an MFP (Multi Function Peripherals) 300 connected to an LAN, personal computers (PC) 100a, 100b, serving as clients, a rooter 400 for connecting to the Internet, and a server 200.

A hard disk drive (HDD) 231 is connected to (or contained in) MFP 300, and image data read by a scanner in MFP 300 is once accumulated in hard disk drive 231.

A plurality of user boxes (folders) are provided for each user in hard disk drive 231 in advance. The user designates his/her user box and stores the read image data therein. The user can operate his/her personal computer to retrieve the image data from his/her user box and to transfer it into a folder at his/her personal computer or at the server.

The user can also designate an e-mail account or address to send data to the destination corresponding thereto (which may be a device connected within LAN or may be a device connected over a network such as the Internet) in the form of an e-mail.

It is noted that although FIG. 1 shows that only one FP 300 is connected to the network by way of example, a plurality of MFP 300 may be connected to the network. Similarly, a plurality of servers 200 may be connected to the network. Each device on the network is assigned respective unique identification information (ID information) to allow the device to be identified over the network.

In the shared document management system in the present embodiment, a file can be uploaded from a device connected to the network to another device using an e-mail.

The software of the shared document management system (a shared document management program which is an example of a data management program) is installed on server 200. The user operates his/her personal computers 100a, 100b as clients to access the software of the shared document management system on server 200. The user can also print-out or scan-in a file using MFP 300.

The software of the shared document management system carries out the processing shown in the flow charts as illustrated later.

Main communications between devices are illustrated in the following (A)-(D).

(A) A file stored in the user's personal computers 100a, 100b as clients is uploaded to server 200.

(B) A file stored in server 200 is displayed on or is downloaded to personal computers 100a, 100b.

(C) A file stored in server 200 is printed at MFP 300.

(D) A file obtained by scanning at MFP 300 is stored in server 200.

The description of the following embodiment will mainly illustrate a case where a file stored in user's personal computers 100a, 100b is uploaded to server 200. The present invention, however, is not limited thereto and may be applied to a case where a file is transmitted from one device being connected to another device and is stored in another device.

Figure 2:
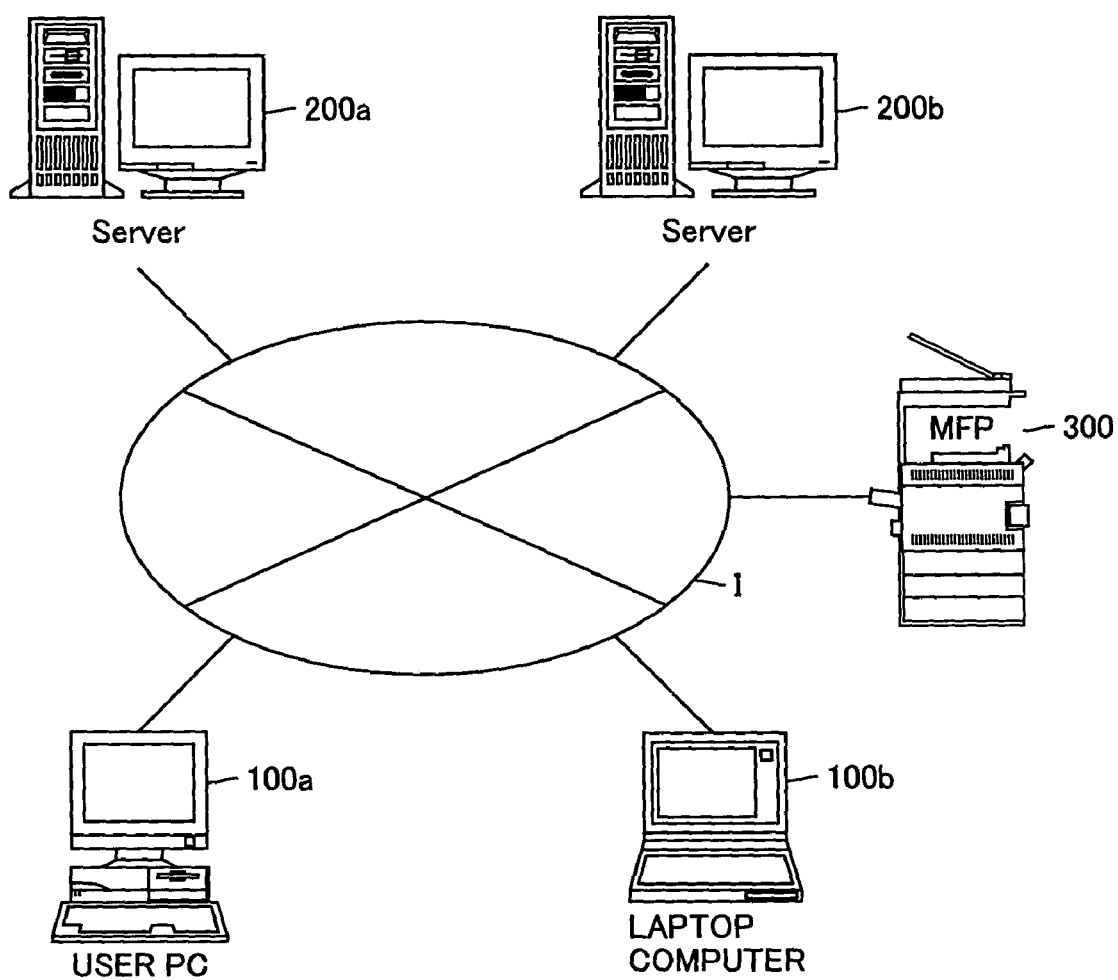
FIG. 2 is a diagram showing another configuration of the shared document management system.

As shown in FIG. 2, the present invention can be applied to a system configured such that servers 200a, 200b, personal computers 100a, 100b, and MFP 300 are connected via a communication line such as the Internet I, and data such as a document is communicated between those devices using e-mails.

Figure 3:
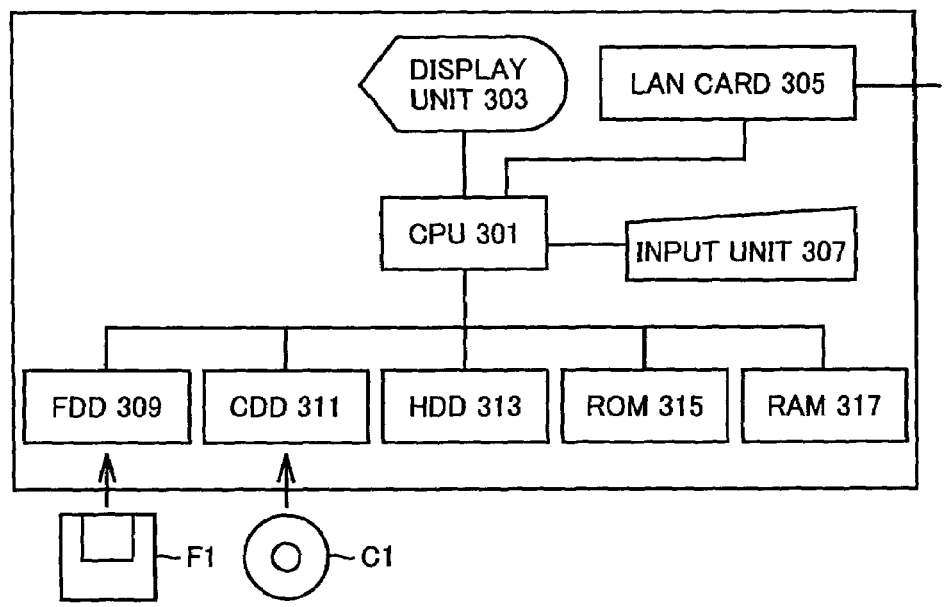
FIG. 3 is a block diagram showing a hardware structure of one of personal computers or a server.

FIG. 3 is a block diagram showing a hardware structure of one of the personal computers or a server.

Referring to FIG. 3, a personal computer or a server includes a CPU 301 controlling the entire device, a display unit 303, an LAN card 305 for connection to LAN, an input unit 307 formed of a keyboard, a mouse, and the like, a flexible disk drive 309, a CD-ROM drive 311, a hard disk drive 313, a ROM 315, and a RAM 317.

Flexible disk drive 309 can be used to read image data or a program recorded on a flexible disk (F1), and CD-ROM drive 311 can be used to read image data or a program recorded on a CD-ROM (C1).

Figure 4:
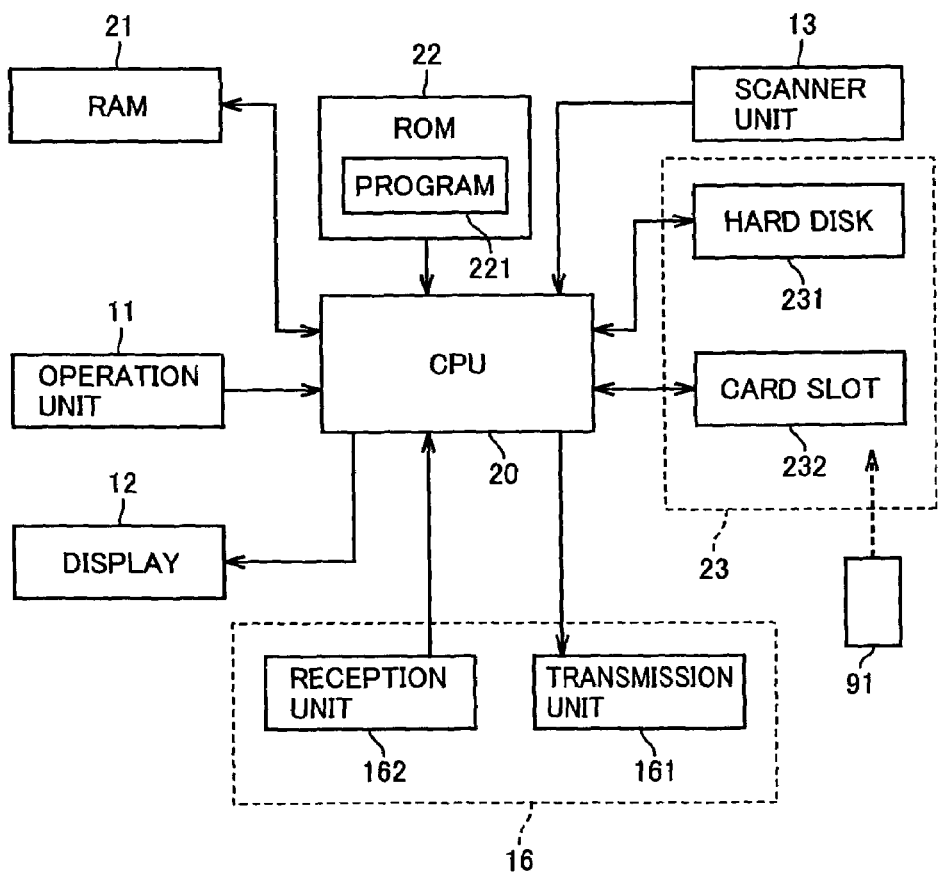
FIG. 4 is a block diagram showing a configuration of MFP.

FIG. 4 is a block diagram showing a hardware structure of MFP 300. MFP 300 includes a CPU 20 performing a variety of operation processing in addition to control of the entire operation of MFP 300. CPU 20 is connected to a Ram 21 storing a variety of data and to a ROM 22 storing a program 221. CPU 20 is also connected to an operation unit 11, a display 12, a scanner unit 13, and a storage unit 23. Storage unit 23 is configured with a hard disk 231 storing image data and the like, and a card slot 232 for reading information from a memory card 91. It is noted that RAM 21 is a non-volatile memory.

A variety of data can thus be communicated between RAM 21, scanner unit 13, hard disk 231, and memory card 91 installed in card slot 232, under the control of CPU 20. Information stored in RAM 21, hard disk 231, and memory card 91 is presented on display 12 under the control of CPU 20.

CPU 20 is further connected to a communication unit 16 including a transmission unit 161 and a reception unit 162 for receiving/transmitting data from/to an external device connected over the network.

Figure 5:
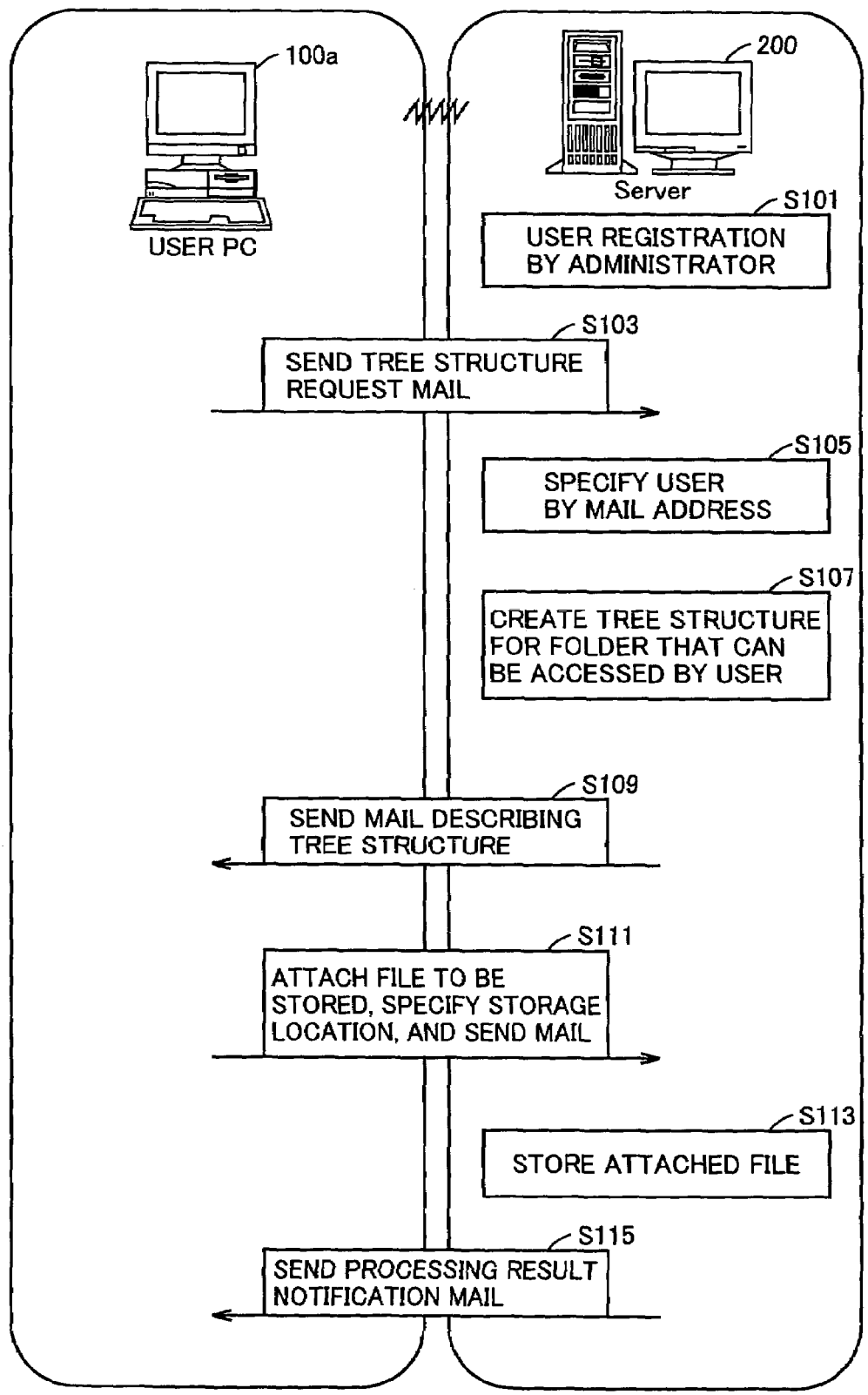
FIG. 5 illustrates file upload processing between a personal computer 100a and a server 200.

FIG. 5 illustrates processing of uploading a file from personal computer 100a to a predetermined folder at server 200. First, at step S101, user registration is performed on server 200 by an administrator.

At step S103, a mail for requesting a tree structure is sent from personal computer 100a to server 200. In response to reception of the tree structure request mail, server 200 specifies the user who has sent the mail by the sender mail address, at step S105.

Next, at step S107, server 200 searches for a folder within server 200 that can be accessed by the specified user, and creates data representative of the tree structure for that folder.

At step S109, a mail in which the tree structure is described is sent from server 200 to personal computer 100a.

The user recognizes the tree structure described in the mail, and sends a mail to server 200 by attaching a file to be stored and specifying a storage folder in the form of a reply to the mail, at step S111.

At step S113, server 200 stores the attached file in the storage folder as designated, in response to the mail sent from personal computer 100a.

At step S115, a mail indicating the result of store processing is sent from server 200 to personal computer 100a.

Figure 6:
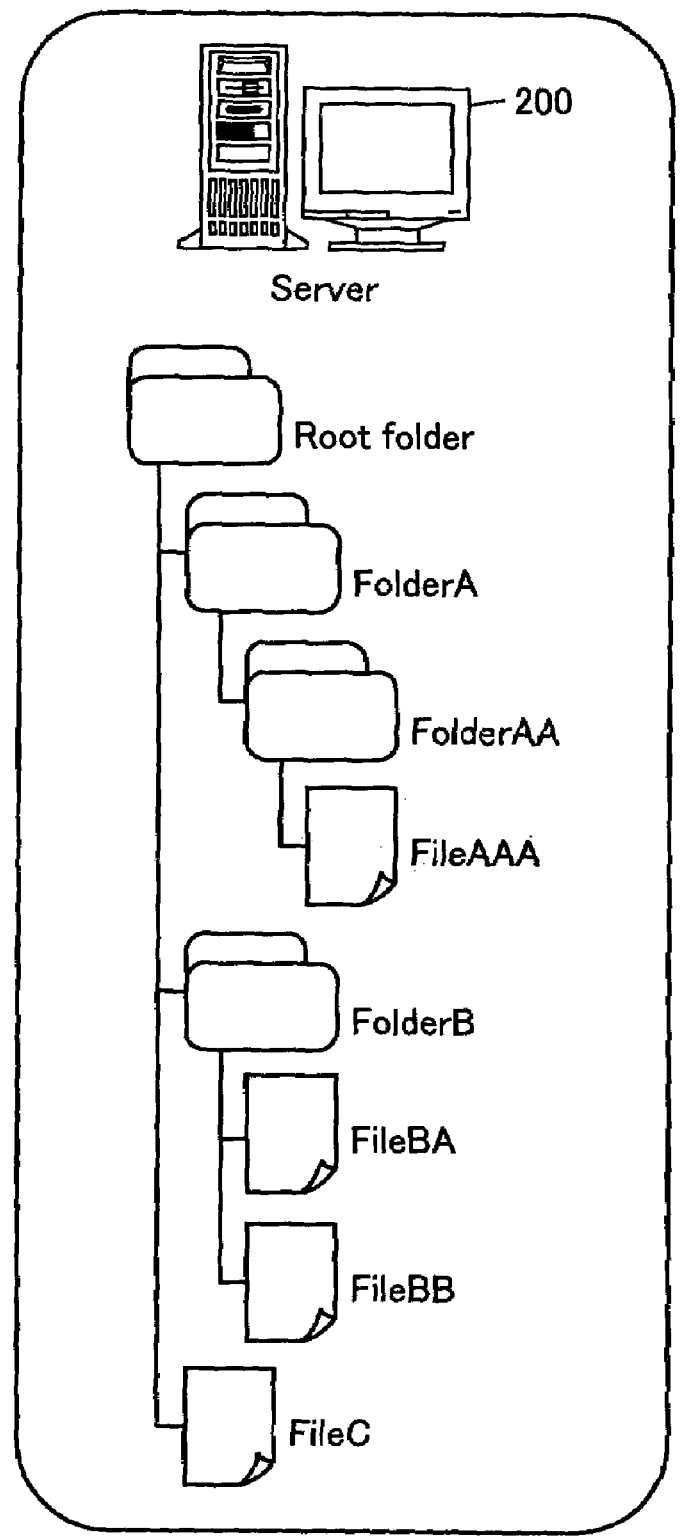
FIG. 6 is a diagram showing a specific example of a tree structure of files in a server.

FIG. 6 is a diagram showing a specific example of a tree structure of folders in the server.

In the present embodiment, all the files managed by the shared document management system are stored in folders. A folder may also be stored in another folder. As a result, a tree structure formed of folders and files is constructed in the system as shown in FIG. 6.

Referring to FIG. 6, in this specific example, a folder A and a folder B as well as a file C are stored in a Root folder, and a folder AA is stored in folder A. A file AAA is stored in folder AA.

A file BA and a file BB are stored in folder B.

Advantageously, files can be managed systematically when managed in this way. In addition, any given folder can be kept secret from any given user group.

Although all the folders are made public to all the groups in the initial setting, the users belonging to a designated group cannot access a designated folder if the administrator keeps it secret.

The system administrator has to set the group to which the user is to belong, when the user registers himself. Therefore, groups must be registered before the user registration.

After the group registration, the user registration is performed by setting the following four items of information.

User ID

Password

Group name to which the user belongs

Mail address

The system permits the user having this information registered in the system to perform the operation on the managed files.

In the following, the procedure for the user to operate the personal computer to upload a file to server 200 will be described in (1)-(6) in the order.

(1) Send a Tree Structure Request Mail

When the user uploads a file to the shared document management system in the present embodiment, the first required procedure is to know the tree structure of folders constructed within the system in order to designate an upload destination. The user first sends the following mail to the system (this corresponds to step S103 in FIG. 5):

Subject: Request Tree

Body Text: ****** (a password set in the user registration). When the system receives this mail, the folder tree structure is created at that time using the method described later.

(2) Specify the User by the Mail Address

When the system receives the mail, the system first recognizes that the subject is "Request Tree" and extracts the sending address of the received mail. Then, it refers to the registered user information and specifies the sender of the received mail (this corresponds to step S105 in FIG. 5). It further verifies the password entered by the sender in the body text, and if this matches that registered in the user registration information, the user is considered to have logged-in. If not, the processing ends by returning to the sender a mail including a text that "the password is incorrect" as shown in FIG. 7.

(3) Create a Tree Structure for the Folders that can be Accessed by the User

If the password entered by the user in the mail body matches the password of that user in the user registration information that is registered in the shared document management system in advance, the system extracts the group including the user from the user registration information. It then searches for the folder that can be accessed by this group, and creates a tree structure for the hit folders in text format (this corresponds to step S107 in FIG. 5).

(4) Send a Mail Describing a Tree Structure

Upon creation of the tree structure in text representation, the shared document management system describes it in the mail body to be returned to the sender. When the tree structure shown in FIG. 6 is constructed in the shared document management system, for example, the mail shown in FIG. 8 is created and returned to the sender (this corresponds to step S109 in FIG. 5).

Referring to FIG. 8, the subject of the mail here is "A Tree in this system", and the body text includes a character string with a comment "the following line should always be included in the reply mail". The character string in the second line in the mail body represents encrypted log-in information of the user. This character string is included in the reply so that the shared document management system can be informed that the user is logging in. This can prevent evil users from using the mail address of the user accessible to the shared document management system thereby to endanger the system.

After the third line of the body text of the mail in FIG. 8, it is shown in text format that folder A and folder B are present in the Root folder and folder AA is included in folder A. It is assumed that the user receiving this mail is not limited in access and can upload a file to all the folder in FIG. 6.

(5) Send an E-Mail by Attaching a File to be Uploaded and Specifying a Storage Location The user can store an attached file in the shared document management system by attaching a file to be uploaded to the mail with the description of the tree structure and returning the mail (this corresponds to step S111 in FIG. 5). The storage location is designated by modifying the description of the tree structure sent from the system.

(5-1) To Store One File in One Folder

Assume that the user stores file X in folder AA, by way of example. Here, the user quotes the mail received from the shared document management system to create the reply mail as shown in FIG. 9. At the head of the line in the quoted portion, a symbol depending on the mailer (here ">") is inserted. This symbol is processed to be ignored at the system side. Here, the subject is "Upload" and the user attaches file X to this mail. The user then inserts a blank line below the line of folder AA.

The mail as shown in FIG. 9 is sent to the server of the shared document management system to cause the system to store file X in folder AA.

(5-2) To Store One File in a Plurality of Folders

Assume that the user stores file X in folder AA and folder B, by way of example. The process of creating a reply mail is the same as (5-1) as described above except the process of designating storage locations. The storage locations can be designated by inserting respective blank lines below the lines of folder AA and folder B as shown in FIG. 10. In other words, the mail as shown in FIG. 10 is sent to the shared document management system to cause the system to store file X in folder AA and folder B.

(5-3) To Store a Plurality of Files in One Folder

Assume that the user stores file X and file Y in folder AA, by way of example. The process of creating a reply mail is similar as (5-1) described above. The user inserts a blank line below the line of folder AA and attaches file X and file Y. In other words, the mail as shown in FIG. 11 is sent to the shared document management system to cause the system to store file X and file Y in folder AA.

(5-4) To Store a Plurality of Files into a Plurality of Folders (1)

Here, it will be described that files to be upload are stored into respective folders. It is assumed that the user stores file X in folder B, and file Y and file Z in folder AA, by way of example. The process of creating a reply mail is similar as (5-1) described above except the process of designating a storage location.

As shown in FIG. 12, the user attaches the files to the mail in the order of file Y, file Z and file X. The storage locations are designated by inserting two blank lines below the folder AA line and one blank line below the folder B line. In other words, the mail as shown in FIG. 12 is sent to the shared document management system to cause the system to store file Y and file Z in folder AA and file X in folder B. By matching the total number of blank lines with the total number of attached files, the system can know which attached file should be stored into which folder.

(5-5) To Store a Plurality of Files in a Plurality of Folders (2)

Here, it will be described that a part or all of files to be uploaded are stored in a plurality of folders. It is assumed that the user stores file X in folder AA and folder B, file Y in folder A, and file Z in the Root folder and folder AA, by way of example.

The process of creating a reply mail is similar as (5-1) described above except the process of designating a storage location.

First, as shown in FIG. 13, the user attaches the files to the mail in the order of file X, file Y, and file Z. The system thereby recognizes file X as "1", file Y as "2", and file Z as "3". To designate the storage locations, the user enters "3" in the line below the Root folder, "2" in the line below folder A, "1, 3" in the line below folder AA, and "1" in the line below folder B. In other words, the mail as shown in FIG. 13 is sent to the shared document management system to cause the system to store file Z in the Root folder, file Y in folder A, file X and file Z in folder AA, and file X in folder B.

It is noted that the process of (5-5) can be applied to the cases where one file is stored in one folder, one file is stored in a plurality of folders, a plurality of files are stored in one folder, and a plurality of files are stored in a plurality of folders, as stated in (5-1)-(5-4).

(6) Send a Processing Result Notification Mail

If the attached file storing processing does not end normally, the shared document management system describes and transmits an error message created during the processing in the mail. If the processing ends normally, the system describes and sends the name of the stored file and the storage folder path in a mail. It follows that the user has logged out (this corresponds to step S115 in FIG. 5).

FIG. 14 illustrates a specific example of a mail sent from the server to the client where the attached file storing processing does not end normally (where the analysis of the folder path has failed).

The user receiving the mail shown in FIG. 14 can realize that the folder designated as a storage location is not present or deleted.

FIG. 15 illustrates a content of a mail sent from the server to the client where the attached file storing processing ends normally (this corresponds to the example of (5-5) described above).

As shown, the user is informed of the location in which the file is stored.

FIG. 16 illustrates a specific example of the user registration information registered in the server.

Referring to FIG. 16, a user address, a user name, a group, an access right, and a password are registered for each user in order to manage user's information.

It is noted that in the system of the present embodiment it is necessary to prohibit the following items so as to perform the above processing properly:

To create a folder named "Root folder" in the shared document management system

To use a plus sign or a vertical line symbol in a folder name, which are characters to describe a tree structure To use a space, a plus sign, or a vertical line symbol in the encrypted user log-in information (a space is prohibited to avoid the appearance of character string "Root folder").

Figure 17:
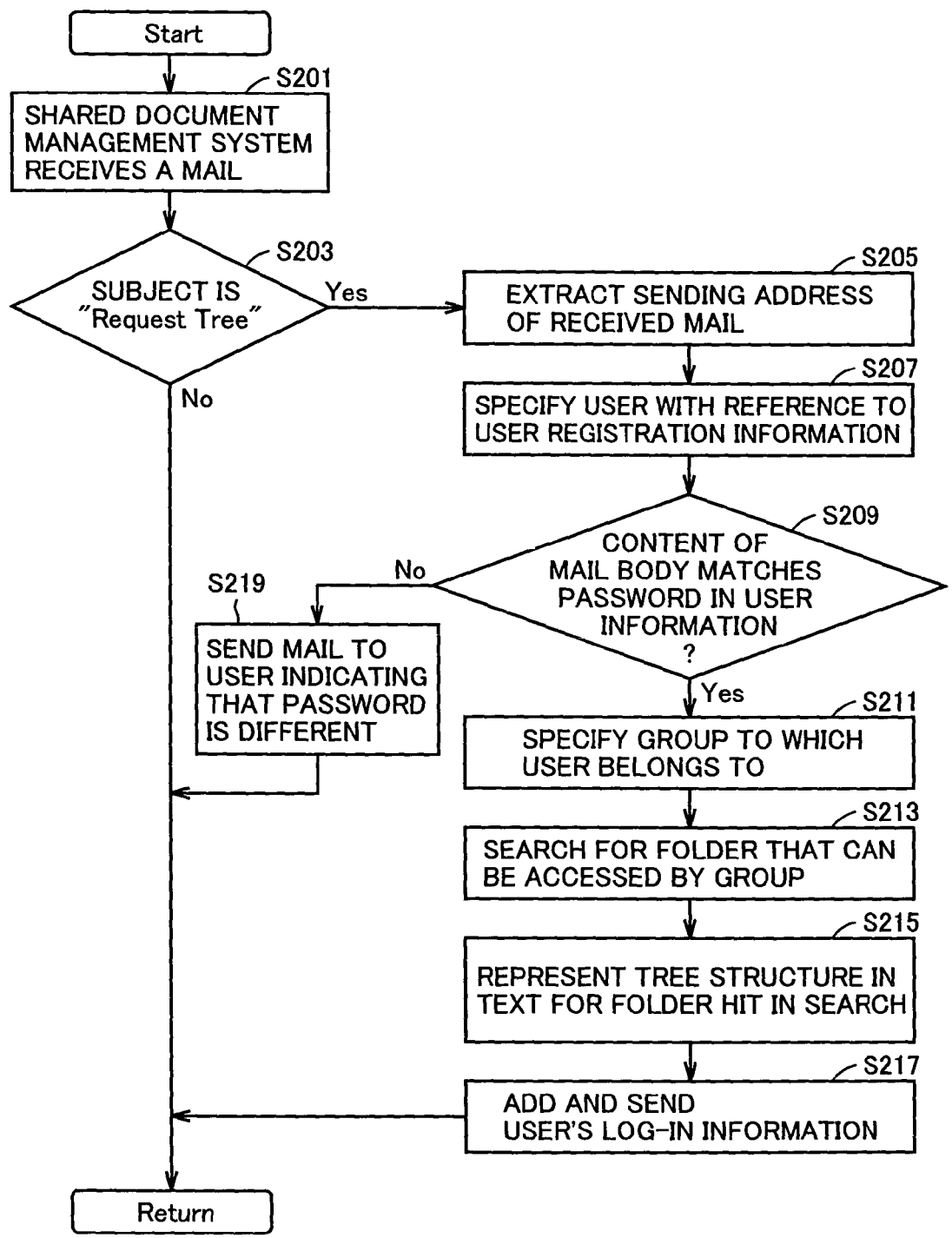
FIG. 17 is a flow chart illustrating processing at the server for a tree structure request mail.

FIG. 17 is a flow chart illustrating the detailed processing at the server at steps S103-S109 in FIG. 5.

Referring to FIG. 17, when the shared document management system receives a mail at step S201, it is determined whether the subject of the mail is "Request Tree" at step S203. If NO, the processing will end, and if YES, the sending address of the received mail is extracted at step S205.

At step S207, the user who has sent the mail is specified with reference to the user registration information shown in FIG. 16.

At step S209, it is determined whether the content of the mail body matches the password in the user information. If NO, a mail is sent to the user indicating that the password is incorrect, at step S219.

If YES at step S209, the group to which the user belongs is specified at step S211, and a search is conducted for the folder that can be accessed by that group.

Then, at step S215, the tree structure for folder hit in the search is represented in text, and at step S217, the user log-in information is attached to the mail and transmitted.

Figure 18:
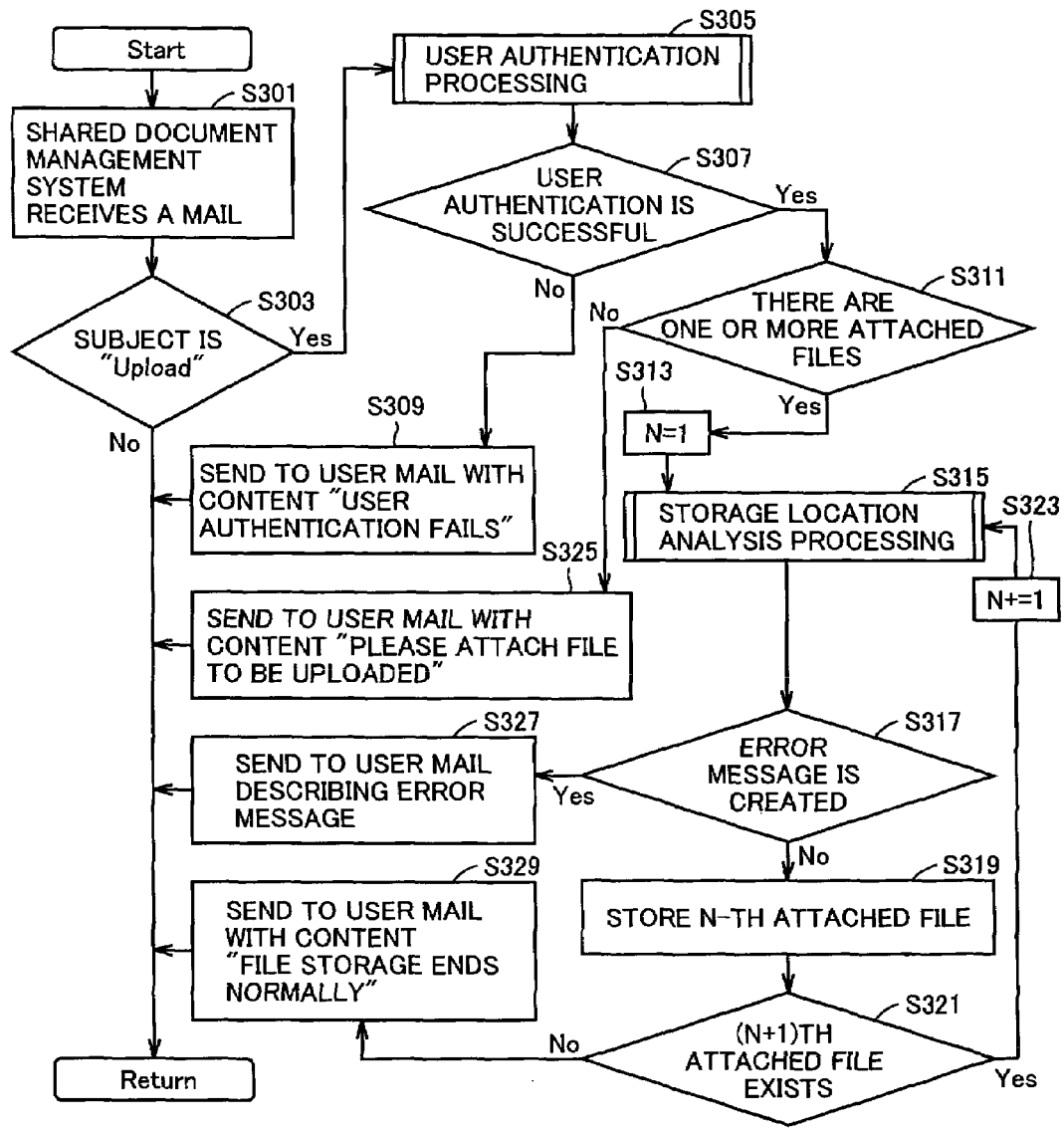
FIG. 18 is a flow chart illustrating processing at the server where an upload request mail is sent.

FIG. 18 is a flow chart illustrating the processing at steps S111-S115 in FIG. 5. In this flow chart, when a mail with a subject "Upload" is received from the user, user authentication is performed and thereafter whether a file is attached or not is checked. If there is no attached file, an error message is sent by mail. If there is an attached file, the storage location is analyzed from the mail body, and if the analysis is successful, the attached file is stored in the designated storage location. On the other hand, if the analysis fails, an error message created during the analysis is sent by mail.

More specifically, referring to FIG. 18, when the shared document management system has received a mail at step S301, it is determined whether the subject is "Upload" at step S303. If NO, the processing here ends, and if YES, user authentication processing is performed (which will be described in detail later) at step S305.

At step S307, it is determined whether the user authentication is successful or not, and if NO, a mail with the content "the user authentication fails" is sent to the user at step S309.

If the user authentication is successful, it is determined at step S311 whether there are one or more attached files. If NO, a mail with the content "please attach a file to be uploaded" is sent to the user at step S325.

If there are one or more attached files, a variable N indicative of the number of the attached file to be processed is replaced with 1 at step S313. Then, at step S315, the processing of analyzing a file storage location (which will be described in detail later) is performed, and at step S317, it is determined whether an error message is created or not.

If an error message is created, a mail with an error message described is sent to the user at step S327. On the other hand, if no error message is created, the N-th attached file as indicated by variable N is stored in the storage location as analyzed.

At step S321, it is determined whether the (N+1)th attached file exists, and if YES, 1 is added to N and the processing from step S315 is repeated.

If NO at step S321, a mail with the content "file storage ends normally" is sent to the user at step S329.

Figure 19:
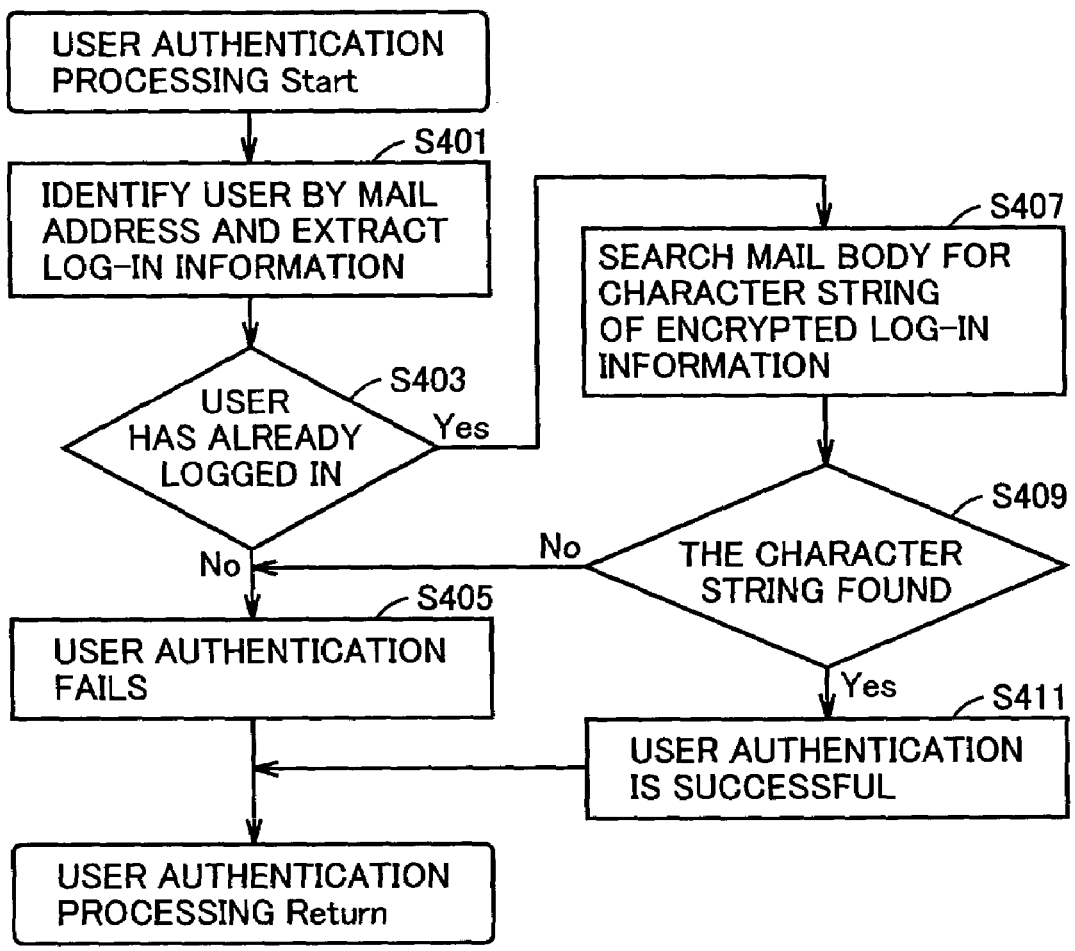
FIG. 19 is a flow chart illustrating the content of user authentication processing (S305) in FIG. 18.

FIG. 19 is a flow chart illustrating the user authentication processing performed at step S305 in FIG. 18. Referring to FIG. 19, the user is identified by the mail address, and the log-in information is extracted at step S401.

At step S403, it is determined whether the user has already logged in, and if NO, it is determined that the user authentication fails at step S405, and the process returns to the main routine.

If the user has already logged in at step S403, the mail body text is searched for the character string of encrypted log-in information at step S407. If the character string is found (YES at step S409), it is determined that the user authentication is successful at step S411, and the process returns to the main routine to proceed to the storage location analysis processing.

If the extraction of log-in information fails or if the encrypted character string cannot be found (NO at step S409), the process proceeds to step S405 where it is determined that the user authentication fails.

Figure 20:
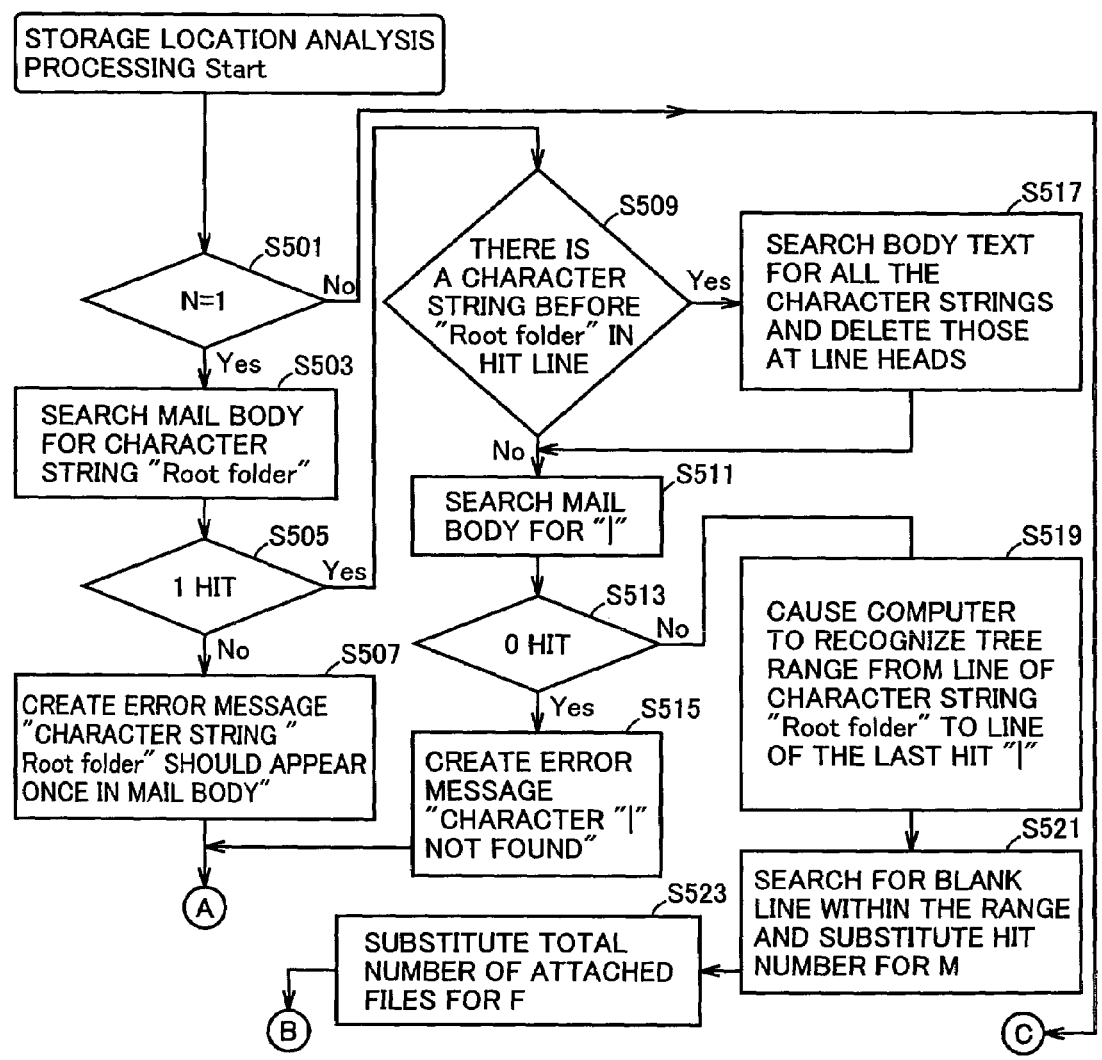
FIG. 20 is a flow chart illustrating the content of storage location analysis processing (S315) in FIG. 18.
Figure 21:
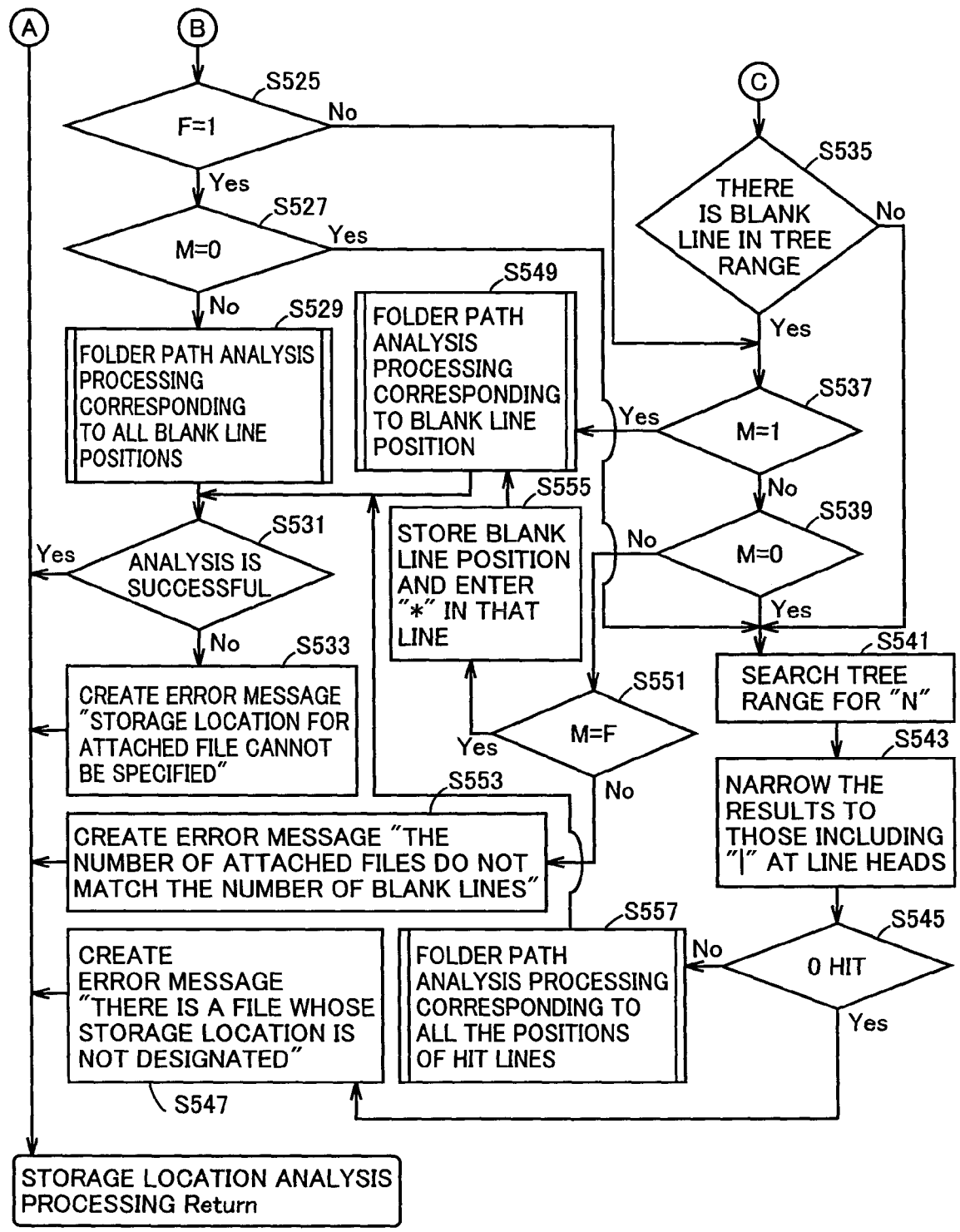
FIG. 21 is a flow chart continued from FIG. 20.

FIG. 20 is a flow chart illustrating the storage location analyzing processing (S315) in FIG. 18, and FIG. 21 is a flow chart continued from FIG. 20.

The processing in the flow charts shown in FIGS. 20 and 21 will be schematically described. First, in order to recognize a tree range in the mail body, the character string "Root folder" that should be on the top of the tree is located. If the storage location is designated normally, this character string always appears only once in the mail body; otherwise an error message is created.

Since the tree range in the mail is described in the text that is created by the shared document management system and is then returned by the user, it likely includes a quote symbol (for example ">") at a line head. The quote symbol is deleted preliminarily, so that the same analysis processing can be performed on any quote symbol. The character string "Root folder" that has been located is described at the line head by the shared document management system during the creation of the tree. Therefore, any possible character string before it may be considered as a quote symbol. If there is a character string before "Root folder", it is regarded as a quote symbol, and if the same character string appears on another line head, it is deleted.

The shared document management system then searches the mail for a vertical line symbol in order to extract the end of the tree range in the mail body. Since this symbol always exists at the end, the detected vertical line symbol at the bottom is determined as the end of the tree range.

After the recognition of the tree range, if there is one attached file, a folder path corresponding to the blank line position within the tree range is specified and the attached file is stored there. If there are plurality of blank lines, the attached file is stored in all the corresponding folder paths. However, the storage location may be designated by providing the number representative of the attaching order as described in (5-5), rather than by a blank line. Therefore, if there is no blank line, the tree range is searched for the character of "1". The attached file is then stored in all the folder paths corresponding to the hit lines.

If there are a plurality of attached files, the number of attached files is compared with the number of blank lines, and if they are equal, the file with the attaching order of 1 is stored in the folder path corresponding to the blank line positioned on the top. Then, "*" is entered in the blank line on the top to remove that blank line.

If there are a plurality of attached files and there is no blank line, it is assumed that the storage location is designated by providing the number representative of the attaching order. In this case, a search is conducted for a number representative of the attaching order of the attached file to be stored at present. The attached file is then stored in the folder path corresponding to the hit line.

After the attached file is stored, the storage location analysis processing exits once. However, in order to store the next attached file, the storage location analysis processing is performed again. After the second analysis processing, the processing of recognizing the tree range is omitted to begin with the blank line search. If there is a blank line, the attached file is stored in the folder path corresponding to the blank line positioned on the top. If there is no blank line, a search is conducted for a number representative of the attaching order of the attached file to be stored at present, and the attached file is stored in the folder path corresponding to the position of the line describing the number. This is repeatedly performed until all the attached files are stored.

If the number of attached files is more than one and the number of blank lines is not 0, and if they are not equal, an error message is output.

Referring to FIG. 20, in the storage location analysis processing, it is determined whether variable N is "1" at step S501. If YES, the mail body is searched for the character string "Root folder" at step S503. At step S505, it is determined whether the number of the search hits is 1, and if NO, an error message "the character string "Root folder" should appear once in the body text" is created at step S507. Thereafter the process returns to the main routine.

If YES at step S505, it is determined whether there is a character string before the hit line "Root folder" at step S509. If YES, the body text is searched for all such character strings, and the symbols at the line heads are deleted at step 517. The quote symbols are thus deleted.

At step S511, the mail body text is searched for a vertical line symbol. If the number of hits is 0 at step S513, an error message "no vertical line symbol is found" is created at step S515, and the process returns to the main routine.

If the number of hits is not 0 at step S513, the computer is caused recognize the tree range from the line of the character string "Root folder" to the line of the last hit vertical line symbol.

At step S521, the tree range is searched for a blank line and the number of hits is substituted for M. Thereafter, the total number of attached files is substituted for variable F at step S523.

Then, at step S525, it is determined whether F=1, and if YES, it is determined whether M=0 at step S527.

If NO at step S527, the folder path analysis processing (FIG. 22) corresponding to all the blank line positions is performed at step S529. If the analysis is successful at step S531, the process returns to the main routine. If the analysis fails, an error message "a location to store the attached file cannot be specified" is created at step S533, and the process returns to the main routine.

If YES at step S527, the tree range is searched for the numerical value "N" at step S541, and the search results are narrowed to those including vertical line symbols at the line heads at step S543.

It is determined whether the number of hits is 0 at step S545, and if NO, the folder path analysis processing is performed for all the hit positions at step S557, followed by step S531.

If YES at step S545, an error message "there is a file whose storage location is not designated" is created at step S547, and the process returns to the main routine.

If it is determined that F≠1 at step S525, it is determined whether M=1 at step S537. If YES, the folder path analysis processing corresponding to the blank line position is performed at step S549, followed by step S531.

If NO at step S537, it is determined whether M=0 at step 539, and if YES, step S541 will follow. If NO, it is determined whether M=F at step S551. Here, if YES, the blank line position is stored at step S555, and "*" is entered in that line. Step S549 then follows.

On the other hand, if NO at step S551, an error message "the number of attached files does not match the number of blank lines" is created at step S553, and the process returns to the main routine.

If NO at step S501, it is determined whether there is a blank line in the tree range at step S535. If YES, step S537 will follow, and if NO, step S541 will follow.

Figure 22:
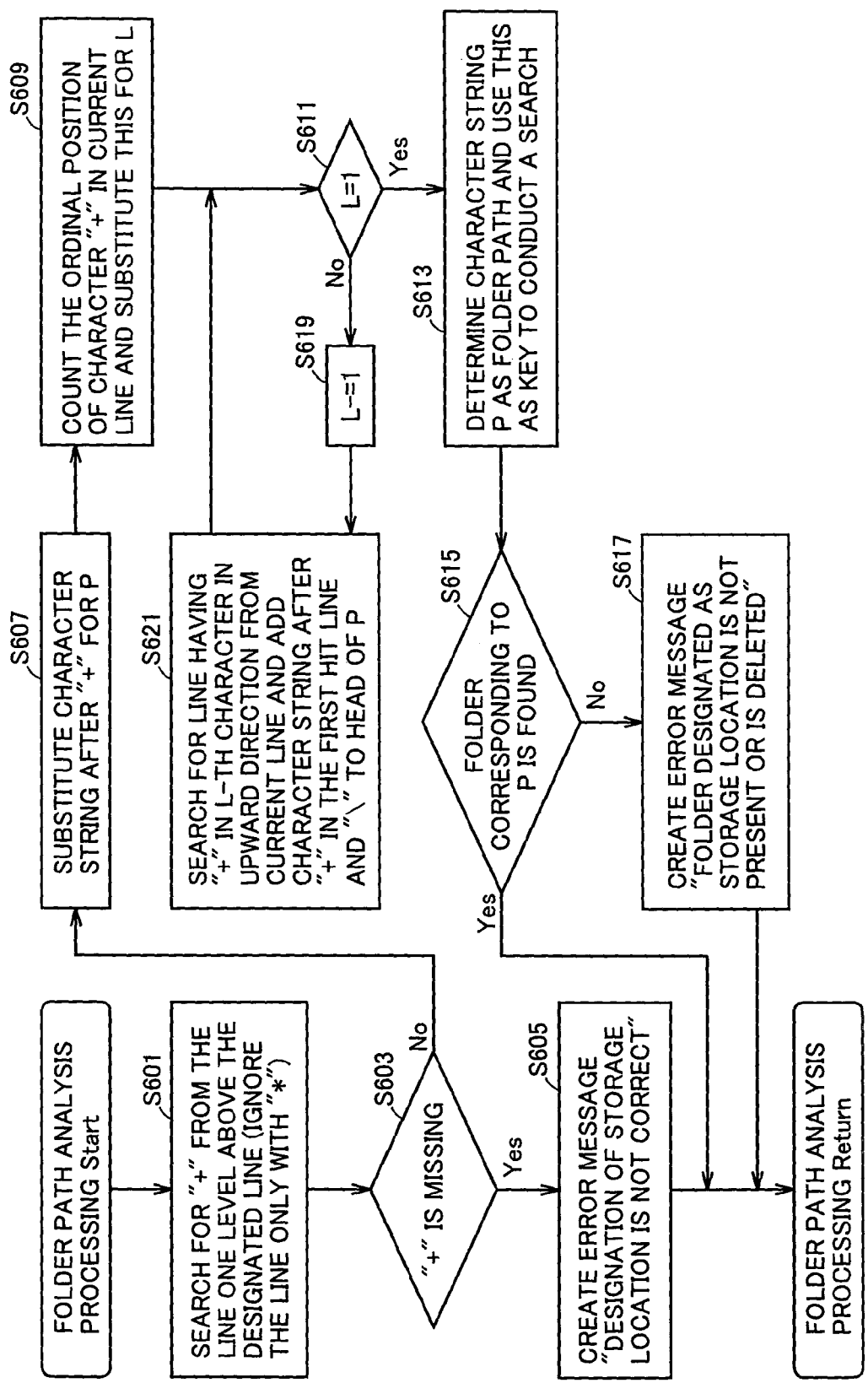
FIG. 22 is a flow chart illustrating the process of folder path analysis processing (S529, S549, S557) in FIG. 21.

FIG. 22 is a flow chart illustrating the folder path analysis processing performed at step S529, S549 or S557 in FIG. 21. Referring to FIG. 22, this processing is always invoked from the flow chart of FIG. 21, and in any case, a line within the tree range is passed as an argument. The folder path is created by tracing from "the current folder" to the parent folder. The name of the folder corresponding to "the current folder" is described after "+" which is one line above the line passed as an argument. It is noted that the line one level above may be only "*" in some cases, and it is then ignored.

Variable P is replaced with the character string after "+", and variable L is replaced with the ordinal position of character "+" in this line. The number applied to L represents the level on which the folder exists starting from "Root folder". If L is 1, that folder is positioned immediately below "Root folder".

If L is 2 or more, 1 is subtracted from L, and a search is conducted in the upward direction for the line having "+" in the L-th character. Then, the character string after "+" and "\" representative of the boundary between the folder names are added to the head of P.

This is repeated until L becomes 1, thereby resulting in a folder path for P. A search is conducted for a folder corresponding to P, and if it is found, the processing is completed. If it is not found, an error message is output.

It is noted that if the file storage location is immediately below the Root folder, the analysis processing in FIG. 22 is unnecessary and thus not performed.

In the following, referring to the flow chart, the folder path analysis processing will be described in more detail. Referring to FIG. 22, at step S601, a search for "+" is conducted from the line one level above the designated one (the line only with "*" is ignored).

At step S603, it is determined whether "+" is missing, and if YES, an error message "the designation of the storage location is not correct" is created at step S605, and the process returns to the main routine.

If NO at step S603, P is replaced with the character string after "+" at step S607. Thereafter, at step S609, the ordinal position of character "+" in the current line is counted and is then substituted for L.

It is determined whether L=1 at step S611, and if NO, 1 is subtracted from the value of L at step S619. At step S621, a search is conducted in the upward direction starting from the current line to find a line having "+" in the L-th character, and the character string after "+" in the first hit line and "\" are added to the head of P. The process returns to S601.

If YES at step S611, character string P is determined as the folder path at step S613, and it is used as a key to carry out a search.

At step S615, it is determined whether a folder corresponding to P is found, and if YES, the process returns to the main routine. If NO, an error message "the folder specified as the storage location does not exist or is deleted" is created at step S617, and the process returns to the main routine.

As described above, in the present embodiment, the server sends its folder structure to the client in response to the inquiry mail sent from the client. At the client, simply, the file storage folder is designated in the form of a reply to the mail and a mail is sent with the attached file to the server, so that the attached file is stored in the folder designated as the storage location. Therefore, it is possible to store a file in a desired location easily using software for sending a mail.

Although in the embodiment above, a file storage location is designated by inserting a blank line or the like in a mail, a file may be stored by designating a desired storage location with a mark (for example an arrow symbol or the like). Furthermore, although the numbers such as "1", "2", and the like are used to store a plurality of files, a file name may be described directly, or a file can be specified with a symbol such as alphabets or Katakana (Japanese phonetic alphabets), instead.

The type of stored files is not limited to a document, and the present invention is applicable to storage of all kinds of data including image, sound, music, graphics, and the like.

Another Embodiment

In the embodiment above, the folder structure of the server is passed to the user in text form. Alternatively, the folder structure can be passed to the client in HTML format. In this case, the user can designate the file storage location by clicking the storage folder.

More specifically, the shared document management system in accordance with the present embodiment converts the tree structure as created in text representation to HTML file and provides a link to each folder name as shown in FIG. 23. This HTML file is attached to a mail or is sent to the user as an HTML mail.

The user receives the HTML mail describing the tree structure from the server and clicks the link provided for the storage folder name. The mailer is then activated to describe a subject and a body text automatically, as shown in FIG. 24. The user can store a file at the server by attaching the file to be stored to this mail and returning it to the server. The character string described in the body text of the mail shown in FIG. 24 is the encrypted log-in information and storage folder name.

The server analyzes the mail body text, and if it finds the log-in information correct and can specify the storage folder name, it stores all the attached files in that folder. On the contrary, if the log-in information is incorrect or the storage folder name cannot be specified, the user is informed about that by mail.

In the present embodiment, it must be prohibited to rewrite the subject or the body text in the automatically-created mail in order to perform the processing correctly.

As described above, in the data management system according to the present embodiment, when a mail is sent from the client to the document management device for inquiring its folder structure, the document management device sends its folder structure to the client by mail in response to the inquiry mail sent from the client. At the client, a storage folder is designated in the form of a reply to the mail sent from the document management device, and a mail is sent to the document management device with an attached file. At the document management device, the attached file is stored in the designated storage folder in response to the mail sent from the client. Therefore, it is possible to provide a data management system that allows the user to designate a file storage location easily.

Furthermore, at the data management program, its folder structure is sent to the client by mail in response to the inquiry mail sent from the client. When a mail in the form of a reply to the mail that has been sent is received from the client with an attached file and with a designation of a storage folder, the attached file is stored in the designated storage folder. Therefore, it is possible to provide a data management program that allows the user to designate a file storage location easily.

In addition, authentication is performed by comparing the client information described in the inquiry mail sent from the client with the client information as registered. Additionally, when a folder structure is sent to the client by mail, a character string of encrypted information indicative of current log-in is sent together, and upon reception of a mail from the client, it is confirmed whether the encrypted character string that has been sent previously is described in the mail. Therefore, it is possible to provide a data management program with improved security.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data management system comprising:
   a first transmission portion sending an inquiry mail from a client to a server for inquiring about a folder tree structure at the server;
   a second transmission portion, at said server, transmitting a pictorial representation of the folder tree structure in text format to said client by mail in response to the inquiry mail sent from said client;
   a third transmission portion, at said client, designating a storage folder within the folder tree structure contained in the mail sent from said server in the form of a reply to the mail sent from said server by altering the pictorial representation of the folder tree structure contained in the mail sent from said server, and sending a reply mail with the altered pictorial representation of the folder tree structure in text format and an attached file to said server; and
   a storage portion, at said server, storing the attached file in the storage folder as designated in the reply mail, in response to the reply mail sent from said client.

2. The data management system according to claim 1, wherein, when receiving the pictorial representation of the folder tree structure in the text format, said third transmission portion designates a storage folder for storage of the attached file by quoting the text contained in the mail sent from said server.

3. The data management system according to claim 1, wherein said second transmission portion sends the pictorial representation of the folder tree structure in text format converted into in HTML format to the client, and when receiving the representation of the folder tree structure converted into the HTML format, said third transmission portion designates a storage folder for storage of the attached file by clicking the storage folder.

4. The data management system according to claim 1, wherein said second transmission portion performs authentication by comparing client information described in the inquiry mail sent from the client with client information as registered, and sends the representation of the folder tree structure by mail only to the client that is successfully authenticated.

5. The data management system according to claim 1, wherein said second transmission portion sends by mail only a representation of the folder tree structure that can be accessed by the client that is successfully authenticated.

6. The data management system according to claim 1, wherein said second transmission portion sends a character string of encrypted information indicative of a current log-in together with the representation of the folder tree structure when sending the representation of the folder tree structure to the client by mail.

7. The data management system according to claim 6, wherein upon reception of a reply mail from said client, said storage portion determines whether the encrypted character string that has been sent previously is described in the reply mail, and stores the attached file in the designated storage folder only when the encrypted character string is described in the reply email.

8. The data management system according to claim 1, wherein said third transmission portion attaches and sends a plurality of files to one reply mail.

9. The data management system according to claim 1, wherein said third transmission portion sends a reply mail in a format that allows a plurality of files to be stored in respective different folders.

10. A computer-readable recording medium having a data management program recorded thereon for causing a computer to execute:
    a first step of sending a pictorial representation of a folder tree structure in text format to a client by mail in response to an inquiry mail sent from the client;
    a second step of receiving from the client a reply mail including an attached file and an alteration of the pictorial representation of the folder tree structure contained in the mail sent in the first step; and
    a third step of storing the attached file contained in the reply mail in a designated storage folder within the folder tree structure contained in the mail sent in said first step when the reply mail is received from said client in said second step, by determining the designated storage folder in the folder tree structure based on the alteration of the pictorial representation of the folder tree structure in text format contained in the reply mail from the client.

11. The computer-readable recording medium according to claim 10, wherein, at said first step, the data management program causes the computer to perform authentication by comparing client information described in the inquiry mail sent from the client with client information as registered, and a representation of the folder tree structure is sent by mail only to the client that is successfully authenticated.

12. The computer-readable recording medium according to claim 11, wherein, at said first step, the data management program causes the computer to send by mail only a representation of the folder tree structure that can be accessed by the client that is successfully authenticated.

13. The computer-readable recording medium according to claim 10, wherein, at said first step, the data management program causes the computer to send a character string of encrypted information indicative of a current log-in together with the representation of the folder tree structure when the representation of the folder tree structure is sent to the client by mail.

14. The computer-readable recording medium according to claim 13, wherein, at said second step, upon reception of a reply mail from said client, the data management program causes the computer to determine whether the encrypted character string that has been sent previously is described in the reply mail, and store the attached in the designated storage folder only when the encrypted character string is determined to be described in the reply email.

15. The data management program product according to claim 10, wherein, at said first step, the data management program causes the computer to convert the pictorial representation of the folder tree structure into HTML format and send the mail in HTML format to the client.

16. A data management server comprising:
    a transmission portion sending a pictorial representation of a folder tree structure in text format to a client by mail in response to an inquiry mail sent from the client;
    a receiving portion receiving from the client a reply mail including an attached file and an alteration of the pictorial representation of the folder tree structure contained in the mail sent by said transmission portion; and
    a storage portion storing the attached file contained in the reply mail into a designated storage folder within the folder tree structure contained in the mail sent by said transmission portion when said receiving portion receives the reply mail from said client, by determining the designated storage folder in the folder tree structure based on the alteration of the pictorial representation of the folder tree structure in text format contained in the reply mail from said client.

17. The data management server according to claim 16, wherein processing is changed in accordance with a title of a mail sent from the client.

18. The data management server according to claim 17, wherein a representation of the folder tree structure is sent to the client only when the title of the mail sent from the client implies an inquiry about the folder tree structure.

19. The data management server according to claim 17, wherein the attached file is stored only when the title of the reply mail sent from the client implies storage of the attached file.

20. The data management server according to claim 1, wherein said third transmission portion designates the storage folder by inserting a blank line below the storage folder in the representation of the folder tree structure contained in the mail sent from said server, in the reply mail sent to said server.

21. The data management server according to claim 1, wherein said third transmission portion is configured to designate the attached file to be stored in a plurality of different storage folders within the folder tree structure by inserting a blank line below each storage folder in the representation of the folder tree structure contained in the mail sent from said server, in the reply mail sent to said server.

22. The data management server according to claim 1, wherein said third transmission portion is configured to designate a plurality of attached files to be stored in a plurality of different storage folders by inserting, for each of the plurality of attached files, a respective numerical character corresponding to an order in which the attached files are identified in the reply email, below a representation of a respective one of the plurality of folders in which the attached files are to be stored.

* * * * *